United States Patent [19]

Amanuma et al.

[11] Patent Number: 4,796,044

[45] Date of Patent: Jan. 3, 1989

[54] AUTO-FOCUS CAMERA

[75] Inventors: Tatuo Amanuma; Kenji Ishizuki, both of Tokyo; Yoshiaki Ohtsubo, Yokohama, all of Japan

[73] Assignee: Nikon Corporation, Tokyo, Japan

[21] Appl. No.: 24,133

[22] Filed: Mar. 11, 1987

[30] Foreign Application Priority Data

Mar. 18, 1986 [JP] Japan .................................. 61-60033

[51] Int. Cl.⁴ ............................................... G03B 3/00
[52] U.S. Cl. ...................................... 354/403; 354/402
[58] Field of Search ................................. 354/403, 402

[56] References Cited

U.S. PATENT DOCUMENTS

| | | | |
|---|---|---|---|
| 3,906,389 | 9/1975 | Matsumoto et al. | 354/403 |
| 4,032,934 | 6/1977 | Hendrickson et al. | 354/403 |
| 4,618,235 | 10/1986 | Ishida et al. | 354/403 |
| 4,673,274 | 6/1987 | Nagaoka et al. | 354/403 |

*Primary Examiner*—Russell E. Adams
*Attorney, Agent, or Firm*—Shapiro and Shapiro

[57] ABSTRACT

An apparatus emitting a radiation, scanning the emitted radiation and driving a photo-taking lens to the in-focus position in accordance with the outputs of a plurality of light-receiving elements for receiving the radiation reflected by the object field includes preparation means for preparing an output signal variable in conformity with the scanning, on the basis of the outputs of the plurality of light-receiving elements, first comparison means for comparing the output signal with a first reference level and producing a first comparison signal, drive means for driving the photo-taking lens, means responsive to the first comparison signal to stop the drive means from driving the photo-taking lens, second comparison means for comparing the output signal with a second reference level different from the first reference level and producing a second comparison signal, and control means for controlling the variation in the output signal conforming to the scanning in response to the second comparison signal.

8 Claims, 3 Drawing Sheets

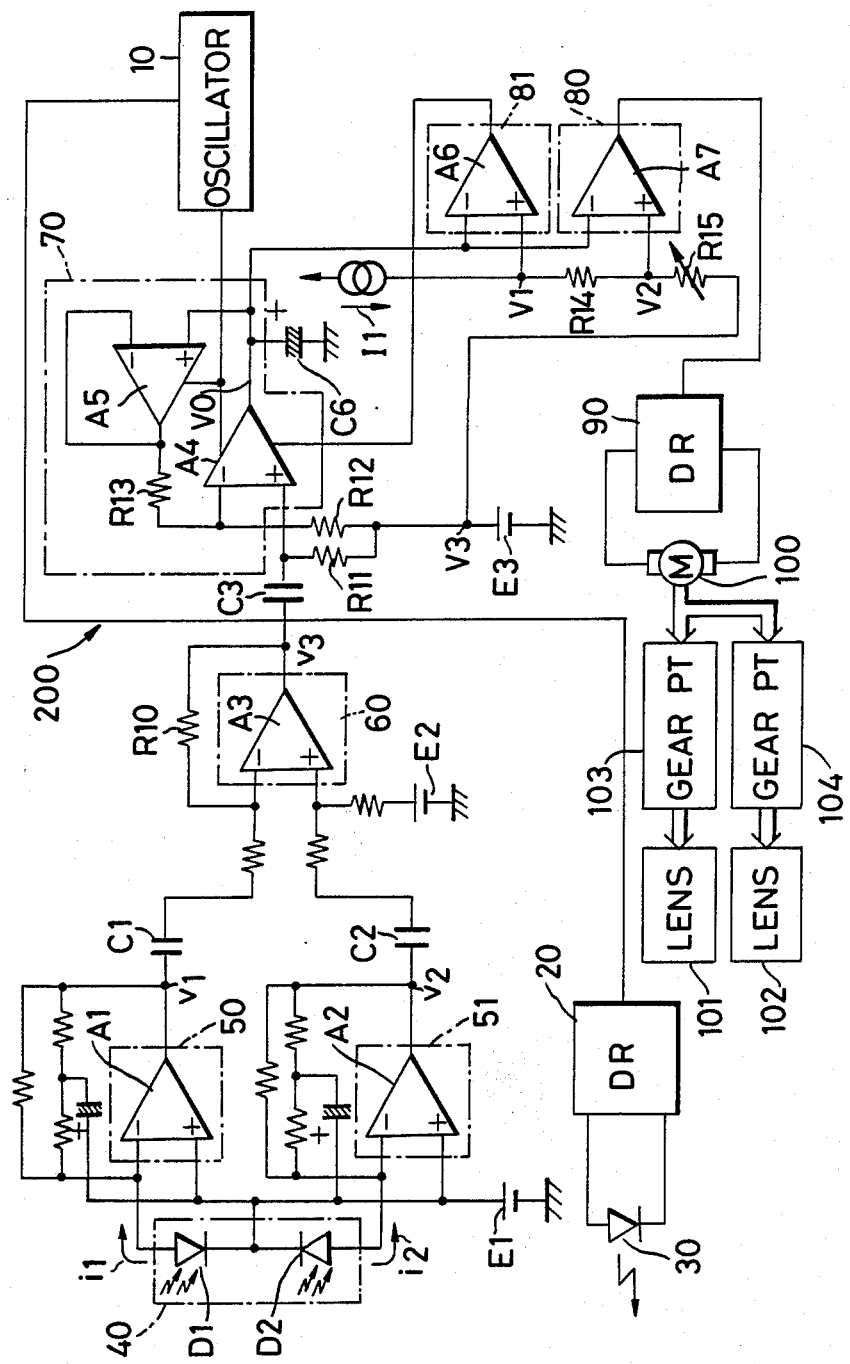
F I G. 1

FIG. 3

GEAR PT — 104 ← M 105
↓
ENCODER — 106
↓
CONT — 107 ← FROM COMPARATOR 80
↓
M — 108
↓
GEAR PT — 103
↑
ENCODER — 109

FIG. 4    PRIOR ART

AUTO-FOCUS CAMERA

BACKGROUND OF THE INVENTION

1. Field of the Invention

This invention relates to an auto-focus camera.

2. Related Background Art

FIG. 4 of the accompanying drawings shows part of an auto-focus camera according to the prior art. When a half-depression switch, not shown, is closed, an oscillator 10 starts operating and electric power is supplied to a driver 20, and an infrared light-emitting diode (hereinafter simply referred to as the light-emitting diode) 30 emits light in synchronism with the oscillator 10. Also, upon closing of the half-depression switch, a photo-taking lens is axially moved and correspondingly thereto, the direction of irradiation of the light-emitting diode 30 changes. In other words, the emitted light from the light-emitting diode 30 scans the object field correspondingly to the amount of axial movement of the photo-taking lens. The emitted light from the light-emitting diode 30 is reflected by the object field and enters two-division silicon photodiodes (hereinafter simply referred to as the photodiodes) D1 and D2 constituting a light-receiving element 40. Output signals $i_1$ and $i_2$ photoelectrically converted by the photodiodes D1 and D2 are amplified by head amplifiers 50 and 51 and input to a differential amplifier 60, whereby a difference signal $v_3$ is obtained. The difference signal $v_3$ is detected in synchronism with the oscillator 10 by a detector 70 and converted into a DC level voltage $V_o$. The output $V_o$ of the detector 70 is input to a comparator 80 and compared with a reference voltage $V_r$. When the detection output $V_o$ becomes smaller than the reference voltage $V_r$, the output $V_{out}$ of the comparator 80 is inverted and a photo-taking lens driving motor 100 is stopped through a motor driver 90. That is, the design is such that the photo-taking lens is axially moved toward the in-focus position until the outputs $i_1$ and $i_2$ of the two-division photodiodes D1 and D2 become equal to each other. Thus, at this point of time, the emitted light is in a predetermined area in the object field.

However, in the above-described auto-focus camera according to the prior art, when the difference signal $v_3$ which is the output of the differential amplifier 60 is detected to obtain a DC level detection output, the detection output varies at a predetermined time constant, and the scanning speed of the light-emitting diode 30 relative to the object field is constant. If the time constant is great, the variation in the detection output is slow and thus responsiveness is poor. Conversely, if the time constant is small, S/N ratio becomes bad, and this has led to a problem that distance measurement accuracy is low.

SUMMARY OF THE INVENTION

It is the object of the present invention to provide an auto-focus camera which is good in responsiveness and also good in S/N ratio.

The present invention is provided with discriminating means for comparing a difference signal corresponding to the difference between the outputs of at least two light-receiving elements with a second reference voltage different from a first reference voltage and discriminating that the scanning position of a light-emitting element or light-receiving elements is a predetermined position before the in-focus position. Control means causes the amount of variation in the difference signal to vary at a first time constant until the predetermined position is discriminated and to vary at a second time constant greater than the first time constant after the predetermined position has been discriminated.

BRIEF DESCRIPTION OF THE DRAWINGS

FIG. 1 is a block diagram showing an embodiment of the present invention.

FIG. 3 is a block diagram showing an example of the improvement in the embodiment of the present invention.

FIG. 4 is a block diagram showing an example of the automatic focus detecting circuit according to the prior art.

DESCRIPTION OF THE PREFERRED EMBODIMENTS

Figure 2:
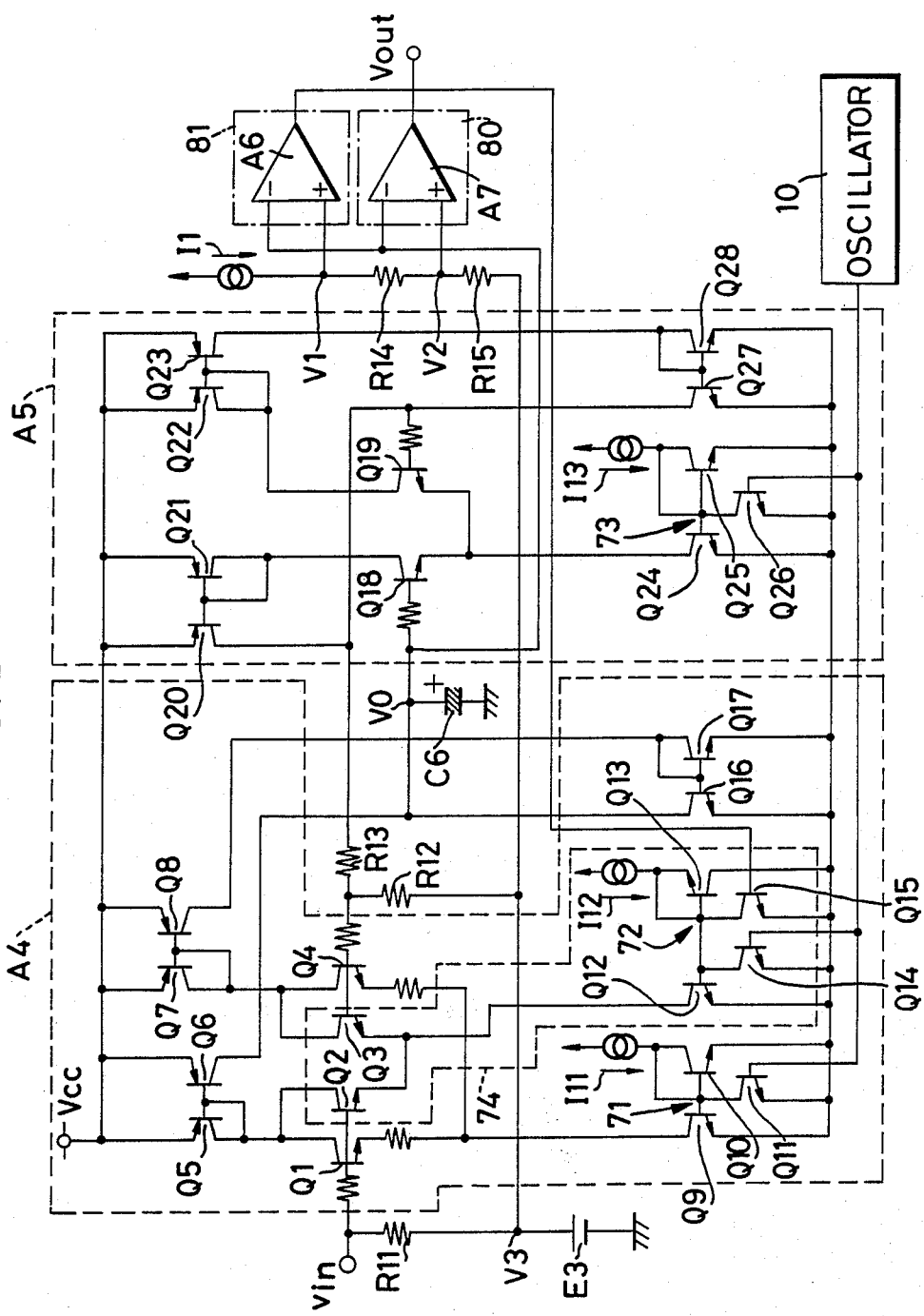
FIG. 2 is a detailed circuit diagram of the detecting circuit of FIG. 1.

FIG. 1 shows an embodiment of an auto-focus camera according to the present invention, and FIG. 2 is a detailed circuit diagram of the detecting circuit thereof. In these figures, parts similar to those in FIG. 4 are given similar reference characters.

In FIG. 1, when a half-depression switch, not shown, is closed, an oscillator 10 outputs a clock signal and a motor 100 is driven through a motor driving circuit 90. A lens 101 is a photo-taking lens. A gear part 103 moves the lens 101 in the direction of the optic axis. A lens 102 is a projection lens for projecting the light of a photodiode 30 onto an object to be photographed, and a gear part 104 rotates the lens 102 in the scanning direction of the object to be photographed. The gear parts 103 and 104 are driven at the same time by the motor 100. The clock signal is supplied to a light-emitting diode driving circuit 20 and an infrared light-emitting diode 30 is modulated and caused to emit light. In the ensuing description, it is to be understood that the diode 30 emits light when the clock signal is at a low level (hereinafter referred to as "L"). The light from the light-emitting diode 30 scans the object field at a predetermined speed with the aid of the lens 102 and the gear part 104 in operative association with the aforementioned motor 100. The reflected light from the object field enters a light-receiving element 40 comprising two-division silicon photodiodes D1 and D2.

Describing now the quantities of light entering the photodiodes D1 and D2, the design is such that before the lens driving motor 100 starts driving, the quantity of light entering the photodiode D1 is greater than the quantity of light entering the photodiode D2, and when the driving circuit 90 supplies electric power to the lens driving motor 100 and correspondingly thereto the light from the light-emitting diode 30 scans the object field, the quantity of light received by the photodiode D1 decreases below the quantity of light before the lens driving motor 100 begins to operate, and the quantity of light received by the photodiode D2 increases. Further, the camera of the present invention is designed such that the light from the light-emitting diode 30 reflected by the object field when the photo-taking lens 101 is focused enters the photodiodes D1 and D2 in equal quantities.

When the infrared light reflected from the object field enters the photodiodes D1 and D2 constituting the light-receiving element 40, photocurrents $i_1$ and $i_2$ corresponding to the quantities of incident light flow. The photocurrents $i_1$ and $i_2$ are input to head amplifiers 50 and 51 and are current-voltage-converted and amplified thereby and output voltages $v_1$ and $v_2$ are obtained from the head amplifiers 50 and 51. The values of these output voltages also vary in accordance with the magnitudes of the currents $i_1$ and $i_2$. Also, these output voltages $v_1$ and $v_2$ are signals synchronized with the clock signal which is the output of the oscillator 10.

When these output voltages $v_1$ and $v_2$ pass through coupling capacitors C1 and C2 and are input to a differential amplifier 60, the differential amplifier 60 amplifies the two input signals and outputs a difference signal $v_3$. This difference signal $v_3$ passes through a coupling capacitor C3 and is input to operational amplifiers A4 and A5 which constitute a detecting circuit 70. The detecting circuit 70 detects the difference signal $v_3$ from the differential amplifier 60 synchronized with the clock signal from the oscillator 10 and provides a detection output $V_o$. The detection output $V_o$ also is a difference signal corresponding to the difference between the photocurrents $i_1$ and $i_2$, and a difference signal output circuit is constituted by the differential amplifier 60 and the detecting circuit 70. The detection output $V_o$ is compared with a reference voltage $V_2$ by a comparator 80 and with a reference voltage $V_1$ by a comparator 81, and the detection output $V_o$ and the reference voltages $V_1$ and $V_2$ are set in the following relation.

The output voltage $V_o$ of the detecting circuit 70 obtained before the lens driving motor 100 starts to be driven, that is, when the difference between the quantities of light received by the photodiodes D1 and D2 is maximum is set to a level higher than the reference voltage $V_1$ of the comparator 81. Also, the reference voltage $V_2$ of the comparator 80 is of a value lower than $V_1$. Before scanning is started, $V_{in}$ is adjusted so that the potential of the junction between resistors R12 and R13 is high.

When the light-emitting diode 30 scans the object field as the lens driving motor 100 drives, the difference between the quantities of light received by the photodiodes D1 and D2 becomes smaller and in accordance therewith, the output voltage $V_o$ of the detecting circuit 70 drops. While the output voltage $V_o$ is higher than the reference voltage $V_1$ of the comparator 81, the output of the comparator 81 is "L" and the "L" level signal is input to the detecting circuit 70. When the signal from the comparator 81 is at "L" level, the time constant at which the detection output $V_o$ varies becomes smaller and the time during which the detection output $V_o$ varies becomes faster. While the output voltage $V_o$ of the detecting circuit 70 is lower than the reference voltage $V_1$ and higher than the reference voltage $V_2$, the output of the comparator 81 is at a high level (hereinafter referred to as "H"), and when the "H" level signal is input to the detecting circuit 70, the time constant at which the detection output $V_o$ varies becomes greater and the time during which the detection output $V_o$ varies becomes slower and S/N ratio is improved. When the output voltage $V_o$ of the detecting circuit 70 becomes lower than $V_2$, that is, when the photo-taking lens 101 is driven by an amount corresponding to the distance to a predetermined area in the object field and is focused to the predetermined area in the object field and the quantities of light received by the photodiodes D1 and D2 become equal to each other, the output signal of the comparator 80 is inverted to "H", whereby the lens driving motor 100 is stopped through the motor driving circuit 90. This state means that the light emitted from the light-emitting diode 30 lies at a predetermined area on a plane orthogonal to the optic axis of the photo-taking lens 101 (generally an area located at the center of the object field).

The detecting circuit 70 will now be described in detail with reference to FIG. 2.

When the clock signal from the oscillator 10 is "H", transistors Q11, Q14 and Q26 are turned on and therefore, constant current circuits 71, 72 and 73 constituted by a set of transistors Q9 and Q10, a set of transistors Q12 and Q13 and a set of transistors Q24 and Q25, respectively, do not operate and thereby, the entire detecting circuit 70 does not operate. When the clock signal is "L", the transistors Q11, Q14 and Q26 are turned off and the constant current circuits 71-73 operate, whereby the detecting circuit 70 operates. The constant current circuit 72 constituted by the transistors Q12 and Q13 does not operate when the output of the comparator 81 is "H" ($V_o \leq V_2$) because transistor Q15 is turned on, and operates when the output of the comparator 81 is "L" ($V_o > V_2$) because the transistor Q15 is turned off.

The bases of transistors Q1 and Q2 are connected to each other, and the bases of transistors Q3 and Q4 are connected to each other. Transistors Q18 and Q19 together constitute a differential amplifier. A set of transistors Q5 and Q6, a set of transistors Q7 and Q8, a set of transistors Q20 and Q21, a set of transistors Q22 and Q23 and a set of transistors Q27 and Q28 respectively constitute constant current circuits. E1, E2 and E3 designate constant voltage sources.

As described above the constant current circuits 71 and 72 operate when the clock signal from the oscillator 10 is "L" and therefore, the reflected light of the infrared light from the light-emitting diode 30 which emits light only when the clock signal is "L" is detected by the detecting circuit 70. The detection output $V_o$ thereof is compared with the reference voltages $V_1$ and $V_2$ by the comparators 80 and 81, respectively, and when the detection output $V_o$ is a voltage higher than $V_1$ (that is, when the difference between the photocurrents $i_1$ and $i_2$ is great), the output of the comparator 81 becomes "L" and the transistor Q15 is turned off and thus, the constant current circuit 72 operates. Further, at the start of scanning, $V_{in}$ is higher than the potential of the junction between resistors R12 and R13 and therefore, the current flowing to transistors Q3 and Q4 becomes lower than the current flowing to transistors Q1 and Q2. Thus, a current comprising a current equal to the current $I_{11}$ of the constant current circuit 71 and a current equal to the current $I_{12}$ superposed thereon flows to the collectors of transistors Q5 and Q6, but little or no current flows to the collectors of transistors Q7 and Q8. Accordingly, a great current flows to a capacitor C6 connected to the output terminals of operational amplifiers A4 and A5 constituting the detecting circuit 70. However, as the level of $V_{in}$ falls, the difference between the collector currents of transistors Q6 and Q8 becomes smaller and therefore, the value of the current flowing to the capacitor C6 decreases and the value of the output voltage $V_o$ also decreases. At this point of time, the output voltage $V_o$ varies so as to become low quickly. That is, the time constant of the amount of variation in the difference signal $V_o$ is small. When the output voltage $V_o$ is lower than the reference voltage $V_1$ (that is, when the difference between the photocurrents $i_1$ and $i_2$ is small), the output of the comparator 81 becomes "H" and the transistor Q15 is turned on and the constant current circuit 72 does not operate and therefore, the sum of the collector currents of transistors Q1 and Q4 is a current equal to the current $I_{11}$ of the constant current circuit 71. Thereby, the collector currents of transistors Q6 and Q8 are decreased and charges are slowly discharged from the capacitor C6 connected to the output terminals of the operational amplifiers A4 and A5 of the detecting circuit 70 and thus, the output voltage $V_o$ varies slowly. That is, the time constant of the amount of variation in the difference signal $V_o$ becomes greater. A time constant control circuit 74 is constituted by transistors Q2, Q3, Q14 and Q15 and the constant current circuit 72. The operational amplifier A5 provides a gain to the output voltage $V_o$.

Here, a detailed description will be given of the variation in the time constant of the detecting circuit 70 when the reference voltages $V_1$ and $V_2$ of the comparators 80 and 81 are $V = V_2 + 50$ $(mV)$ and $V_2 = V_3$, respectively.

At a point of time whereat $i_1 = i_2$ and $V_{in} = 0$, that is, at a point of time whereat $V_o = V_2$, the output of the comparator 80 becomes "L"→"H", and outputs a motor stop signal $V_{out}$ representative of the fact that in-focus has been established. Before the in-focus is established, that is, at a point of time whereat the output voltage $V_o$ of the detecting circuit 70 has become $V_o = V_1 = V_2 + 50$ $(mV)$, the output of the comparator 81 becomes "L"→"H", and the amount of variation in the output voltage $V_o$ of the detecting circuit 70 with time becomes smaller. In order words, the variation time constant of the detection output voltage $V_o$ is set to a small value when the detection output voltage $V_o$ is higher than the damping level voltage $V_1$, and the variation time constant of the detection output voltage $V_o$ is set to a great value when the detection output voltage $V_o$ is lower than the damping level voltage $V_1$. Accordingly, the responsiveness of the detection output voltage $V_o$ is improved and S/N ratio is improved.

In the camera described in connection with FIGS. 1 and 2, the gear parts 103 and 104 operate in operative association with the motor 100. In contrast, in the block diagram shown in FIG. 3, the light from the light-emitting diode 30 is scanned to detect the distance to a predetermined area in the object field, and in accordance with the detected distance, the photo-taking lens 101 is driven after the termination of the scanning. A motor 105 is controlled by a driver 90, and encoders 106 and 109 are engaged with gear parts 104 and 103, respectively, and detect the amounts of drive of the gear parts 104 and 103. A controller 107 is responsive to the output of the comparator 80 assuming the H level to read the output of the encoder 106 corresponding to the amount of drive of the gear part 104 and drive a motor 108 until the outputs of the encoders 106 and 109 become coincident with each other.

We claim:

1. An apparatus emitting radiation to an object field, comprising:
   (a) radiation detecting means having two elements each of which generates an electrical signal conforming to incident radiation thereon;
   (b) optical means for transmitting radiation reflected by the object field to said radiation detecting means;
   (c) a phototaking lens;
   (d) driving means for driving said phototaking lens;
   (e) scanning means responsive to the driving of said phototaking lens for changing an amount of the incident radiation on each of said two elements so that the amount of the incident radiation on one of said two elements is larger than the amount of the incident radiation on the other of said two elements when said phototaking lens is at an out-of-focus position, and so that the amounts of the incident radiation on said two elements are substantially equal to each other when said phototaking lens is at an in-focus position;
   (f) producing means for producing an output signal conforming to a difference between the levels of said two electrical signals;
   (g) first comparing means for comparing the level of said output signal with a first reference level, detecting that the level of said output signal has a predetermined relationship with said first reference level and thereafter producing a first comparing signal;
   (h) means responsive to said first comparing signal for stopping said driving means from driving said phototaking lens;
   (i) second comparing means for comparing the level of said output signal with a second reference level, detecting that the level of said output signal has a predetermined relationship with said second reference level and thereafter producing a second comparing signal, the level of said output signal changing in one direction during the driving of said phototaking lens, said second reference level being set so that the level of said output signal reaches said second reference level before the level of said output signal reaches said first reference level; and
   (j) control means responsive to said second comparing signal for increasing the time constant of said output signal.

2. An apparatus according to claim 1, wherein said first comparing means detects that the level of said output signal substantially coincides with the level of said first reference level and said second comparing means detects that the level of said output signal substantially coincides with the level of said second reference level.

3. An apparatus according to claim 1, wherein said control means has a capacitor and means responsive to said second comparing signal for controlling the variation of an amount of charges stored in said capacitor, and wherein said capacitor is connected between said producing means and said first comparing means.

4. An apparatus according to claim 3, wherein said scanning means changes a direction of the emitting of the radiation toward the object field during the driving of said phototaking lens.

5. An apparatus emitting radiation to an object field, comprising:
   (a) radiation detecting means provided with a radiation receiving surface for generating a position signal which indicates a position of radiation reflected by the object field on said radiation receiving surface;
   (b) a phototaking lens;
   (c) driving means for driving said phototaking lens;
   (d) scanning means responsive to the driving of said phototaking lens for changing the position of incident radiation on said radiation receiving surface so that the level of said position signal changes in one direction;
   (e) first comparing means for comparing the level of said position signal with a first reference level, detecting that the level of said position signal has a predetermined relationship with said first reference level and thereafter producing a first comparing signal;

(f) means responsive to said first comparing signal for stopping said driving means from driving said phototaking lens;

(g) second comparing means for comparing the level of said position signal with a second reference level, detecting that the level of said position signal has a predetermined relationship with said second reference level and thereafter producing a second comparing signal, said second reference level being set so that the level of said position signal reaches said second reference level before the level of said position signal reaches said first reference level; and (h) control means responsive to said second comparing signal for increasing the time constant of said position signal.

6. An apparatus according to claim 5, wherein said first comparing means detects that the level of said position signal substantially coincides with the level of said first reference level and said second comparing means detects that the level of said position signal substantially coincides with the level of said second reference level.

7. An apparatus according to claim 6, wherein said control means has a capacitor and means responsive to said second comparing signal for controlling the variation of an amount of charges stored in said capacitor.

8. An apparatus according to claim 7, wherein said scanning means changes a direction of the emitting of the radiation toward the object field during the driving of said phototaking lens.

* * * * *